US006609138B1

(12) United States Patent
Merriam

(10) Patent No.: US 6,609,138 B1
(45) Date of Patent: Aug. 19, 2003

(54) E-MAIL LIST ARCHIVING AND MANAGEMENT

(75) Inventor: Charles Merriam, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/263,490

(22) Filed: Mar. 8, 1999

(51) Int. Cl.[7] ............................................. G06F 17/30
(52) U.S. Cl. ...................... 707/204; 707/200; 709/206
(58) Field of Search ................................ 707/204, 200, 707/10, 9; 717/11, 9; 709/206

(56) References Cited

U.S. PATENT DOCUMENTS

| 5,890,163 A | * | 3/1999 | Todd .......................... 707/200 |
| 5,958,005 A | * | 9/1999 | Thorne et al. ............... 709/202 |
| 6,199,052 B1 | * | 3/2001 | Mitty et al. .................... 705/75 |
| 6,240,427 B1 | * | 5/2001 | Szalwinski et al. ......... 707/204 |

FOREIGN PATENT DOCUMENTS

| FR | 2 666 162 | 2/1992 |
| WO | WO 98/58332 | 12/1998 |

OTHER PUBLICATIONS

T. Gray, "Message Access Paradigms and Protocols" *The IMAP Connection* (Aug. 28, 1995–Sep. 28, 1995) printed from <http://www.imap.org/papers/imap.vs.pop.html> on Jul. 26, 2002 (10 pages).

M. Crispin, "Internet Message Access Protocol Version 4rev1, RFC 2060" (Dec. 1996) printed from <http://www.ietf.org/rfc/rfc2060.txt> on Jul. 26, 2002 (69 pages).

J. Takkinen and N. Shahmehri, "CAFÉ:A Conceptual Model for Managing Information in Electronmic Mail," *Proc. 31st Annual Hawaii International Conference on System Sciences* (Jan. 6, 1998) pp. 44–53.

European Search Report on European Patent Application No. EP 00 40 0594 (Aug. 16, 2002) (4 pages).

* cited by examiner

*Primary Examiner*—Hosain T. Alam
*Assistant Examiner*—Jean Bolte Fleurantin
(74) *Attorney, Agent, or Firm*—Finnegan, Henderson, Farabow, Garrett & Dunner, L.L.P.

(57) ABSTRACT

Systems and methods consistent with the present invention provide an automated manager for an electronic mail archive repository. A method of archiving electronic messages consistent with the present invention creates a repository that holds all electronic messages consistent with a set of rules for archive storage. An interface allows clients to retrieve electronic messages from the repository based upon rules limiting access to the repository. Methods and systems, as broadly described herein, comprise a message archive containing a plurality of messages, each having a client identifier and an archive token, and permit a requester access to select messages in the message archive based on an identifier for the requester and consistent with rules for archive retrieval. Additionally, methods and systems, as broadly described herein, comprise the steps of receiving a message, storing the message in a message archive when an indication exists to archive the message and consistent with rules for archive storage, and permitting a requester access to select messages in the message archive based on an identifier for the requester and consistent with rules for archive retrieval.

27 Claims, 8 Drawing Sheets

E-MAIL LIST ARCHIVING AND MANAGEMENT

BACKGROUND OF THE INVENTION

A. Field of the Invention

This invention relates to an archive management system for electronic mail messages and, more particularly, to methods and apparatus for archiving electronic mail messages and accessing archived messages.

B. Description of the Related Art

Many data processing systems permit transmission of electronic mail ("email") messages between various users of the system. A standard feature of all email messages is the presence of a "header." The header portion of an email message typically contains information about the source of the message, its subject, and its destination. The protocol for email headers over the Internet is defined in D. H. Crocker "Standard for the format of ARPA Internet text messages," RFC 822 (August 1982) ("RFC 822"), which is incorporated herein by reference.

The transportation and delivery of email messages can be divided into two categories. The first category is the submission and receipt of messages between a client and an email post office. The second category is the routing of email messages from one post office to another.

There are currently two Internet standards for the submission and receipt of email messages between a client and a post office. One standard is known as "Post Office Protocol version 3" ("POP3") and the other is known as "Internet Message Access Protocol version 4 revision 1" ("IMAP4rev1"). POP3 allows a client to connect to a post office server in order to check for new email messages in the client's mail account and to read header information. In order for a client to read an email message using the POP3 standard, the client needs to download the message to a local directory. The primary features of POP3 are described in M. Rose "Post Office Protocol—Version 3" RFC 1081 (November 1988) and M. Rose "Post Office Protocol—Version 3 Extended Service Offerings" RFC 1082 (November 1988), both of which are incorporated herein by reference.

IMAP4rev1 differs from POP3 in the sense that a client does not have to download an email message to the client's local directory from the post office server in order to read it. IMAP4rev1 allows a client to perform all of the client's mailbox functions with the message retained on the post office server. The features of IMAP4rev1 are described in M. Crsipin "Internet Message Access Protocol—Version 4rev1" RFC 2060 (December 1996), which is incorporated herein by reference. This particular feature of IMAP4rev1 is shared by many proprietary electronic mail systems, such as GroupWise from Novell, Inc. In GroupWise, when a post office receives a message for a given client, it is stored in a database in encrypted form in a mailbox designated for the client. The client is then notified that there is a new message. A configuration with all client mailboxes located on one post office server has the advantage of allowing an administrator to perform tasks associated with managing the server, including the deletion of old messages.

One of the most direct means of making a message available to a number of individuals is to send the message to each individual by including his/her electronic mail address in the header's destination address field such as the "To" or "CC" fields. One could also send the message to an automated mailing list manager that uses a mail exploder to turn a single alias for a distribution list into a series of individual mail addresses, or may forward the message to space dedicated to the distribution list on the post office server and accessible by all client members of the list. Mailing list managers such as LISTSERV of L-Soft International, Inc., listproc, and majordomo allow a client to subscribe or unsubscribe to a given mailing list.

POP3 and IMAP4rev1 also support public mailing lists, or distribution lists. When a message arrives and is addressed to a public distribution list, the post office server either uses a mail exploder to forward copies of the message to the mailboxes of list members or forwards a copy of the message to space specifically dedicated to the distribution list on the post office server that is accessible to all members. The post office server then notifies the respective clients that a message is being retained. The public distribution lists for these systems are generally maintained by an administrator.

The administrator also implements a message archive for archiving copies of incoming and/or outgoing messages for an enterprise. Due to the pervasiveness of email correspondence, an email message archive can contain thousands of messages. Because of the large number of designated clients, the overwhelming number of stored messages, and security concerns, access to such a message archive has been limited only to the administrator. Without completely reproducing the post office server and without the intervention of the administrator to impose some structure on the archive, an individual client cannot effectively sort the email messages located in the archive.

Thus, there is a need for a system and method that overcomes the shortcomings of existing electronic mail systems.

SUMMARY OF THE INVENTION

Systems and methods consistent with the present invention provide an automated manager for an electronic mail archive repository. A method of archiving electronic messages consistent with the present invention creates a repository that holds all electronic messages consistent with rules for archive storage. An interface allows clients to retrieve selected electronic messages from the repository based upon rules for limiting access to the repository.

In accordance with the principles of the present invention, methods and systems, as broadly described herein, comprise a message archive containing a plurality of messages, each having a client identifier and an archive token, and permit a requester access to selected messages in the message archive based on an identifier for the requester and consistent with rules for archive retrieval.

In accordance with another aspect of the present invention, methods and systems, as embodied and broadly described herein, comprise the steps of receiving a message, storing the message in a message archive when an indication exists to archive the message, and permitting a requester access to selected messages in the <message archive based on an identifier for the requester. Predetermined rules may be used to indicate when messages are to be archived and to control access to archived messages.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Whenever possible, the same reference number will be used throughout the drawings and the following description to refer to the same or like parts.

Introduction

In general, methods and apparatus consistent with the present invention examine incoming electronic mail messages and generate an archive token consistent with rules for archive storage. Messages stored in an archive are accessible to clients based on identifying information stored in each message.

The Distributed System

Figure 1:
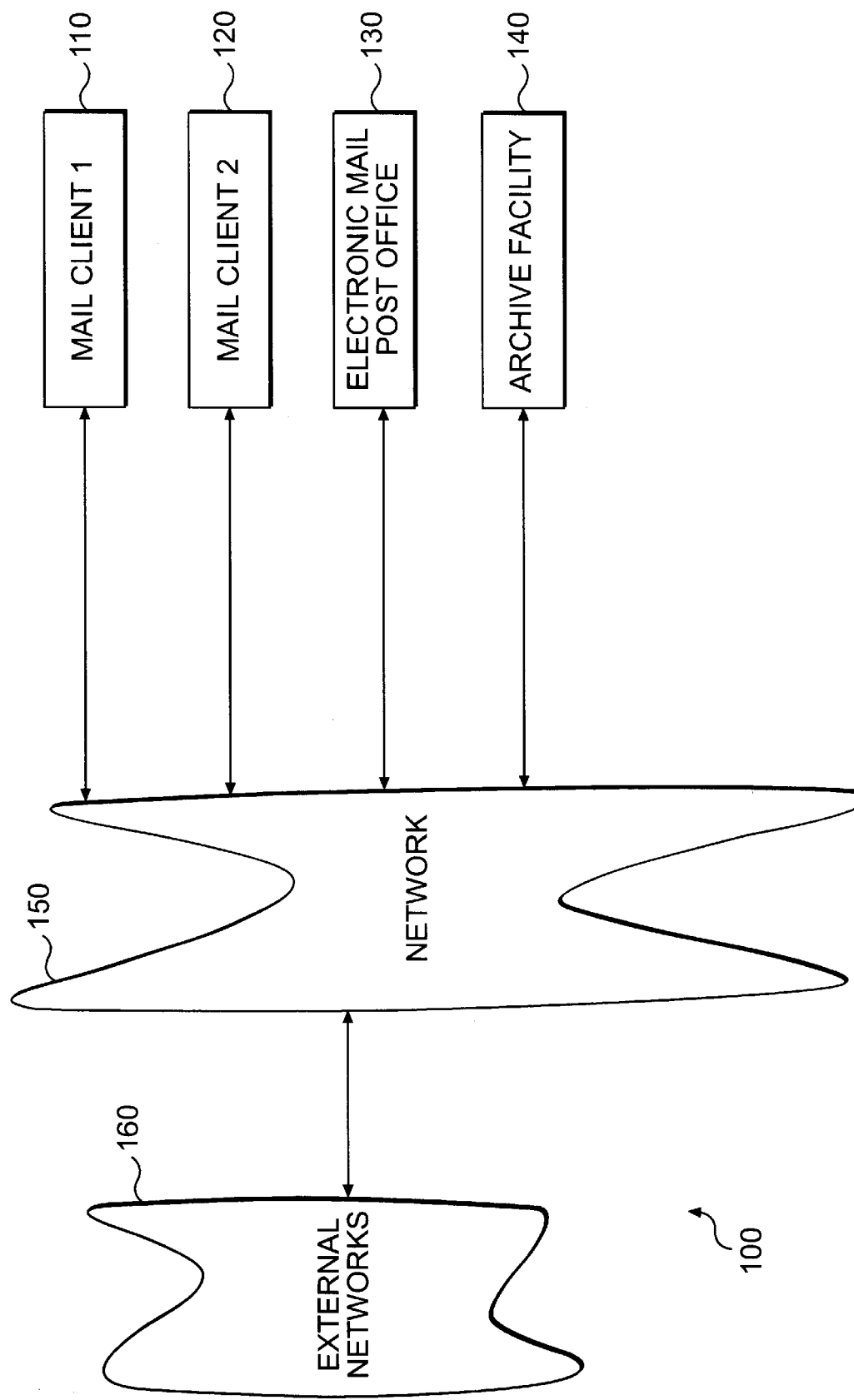
FIG. 1 illustrates an exemplary distributed data processing system in which systems consistent with the present invention may be implemented.

An exemplary distributed system 100 with which methods and systems consistent with the present invention may be implemented is shown in FIG. 1. Distributed system 100 is composed of various components, including both hardware and software. Distributed system 100 includes a network 150, such as a local area network (LAN), wide area network (WAN), or other mechanisms that connect a number of different data processing resources. Network 150 can also be connected to external networks 160, such as the Internet. The resources in distributed system 100 include multiple mail clients 110 and 120, an electronic mail post office 130, and an archive facility 140.

Distributed system 100 is structured to allow mail clients 110 and 120 access to the services of electronic mail post office 130 and to the services of archive facility 140 over network 150. In addition, distributed system 100 allows electronic mail post office 130 to receive messages both from within network 150 as well as from external networks 160. Finally, distributed system 100 allows electronic mail post office 130 to direct messages to archive facility 140 over network 150. Although only two mail clients 110 and 120, one post office 130, and one archive facility 140 are depicted, one skilled in the art will appreciate that distributed system 100 may include additional clients, post offices or archive facilities in various configurations.

Figure 2:
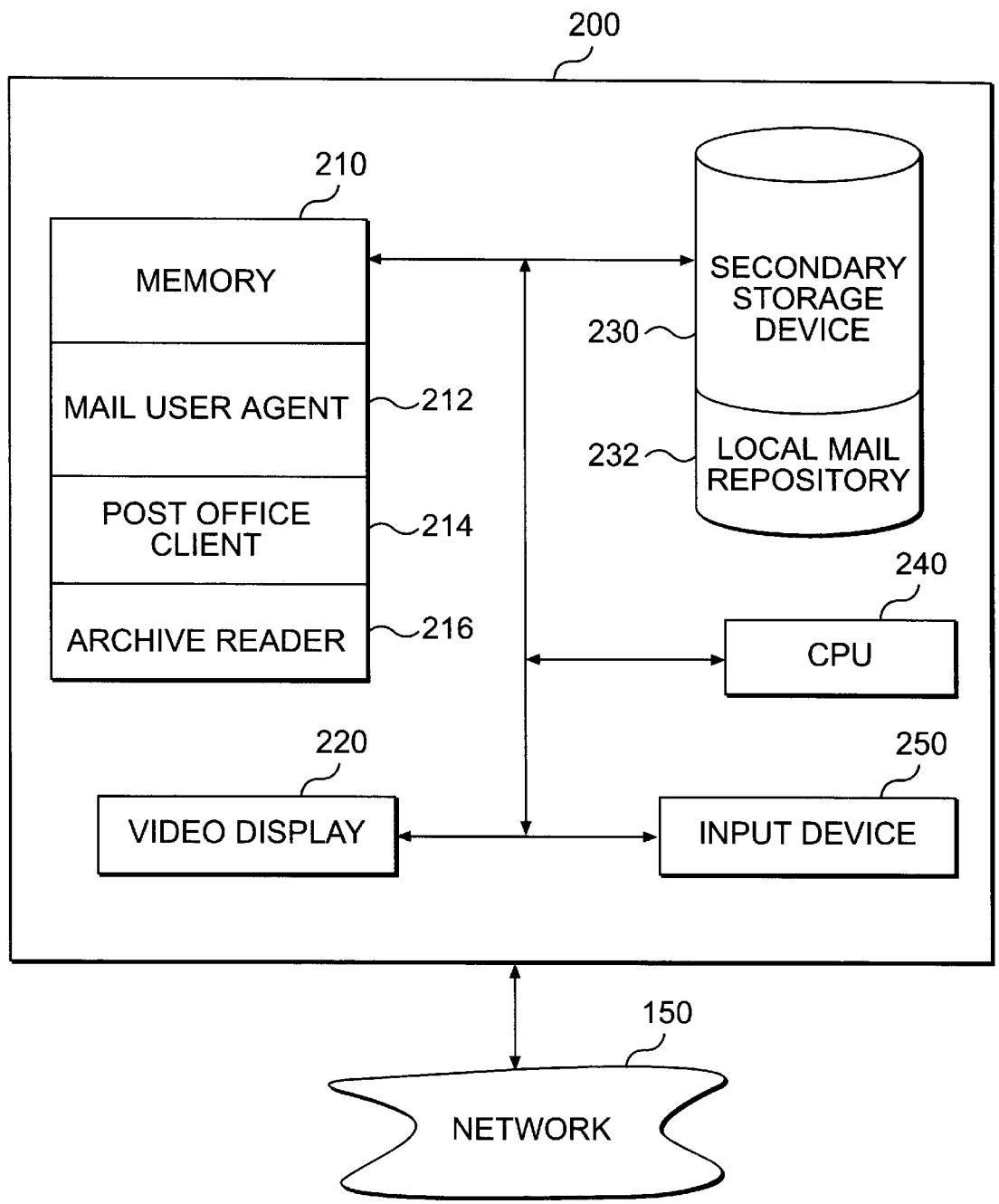
FIG. 2 is a block diagram of an exemplary system architecture for a computer system with which the invention may be implemented.

FIG. 2 depicts a computer architecture 200 associated with a mail client such as client 110 or 120 in greater detail. Computer architecture 200 includes a memory 210, a secondary storage device 230, a central processing unit (CPU) 240, an input device 250, and a video display 220. Memory 210 includes a mail user agent 212, a post office client 214, and an archive reader 216. Secondary storage device 230 can include a local mail repository 232.

As mentioned above, mail client 200 communicates with both electronic mail post office 130 and archive facility 140 over network 150. Mail user agent 212, post office client 214 and archive reader 216 are all computer programs that are executed by CPU 240. Mail user agent 212 is a program, such as a word processor, that is used to prepare an electronic mail message for delivery by post office client 214. Post office client 214 communicates with electronic mail post office 130 to obtain information about the messages retained on electronic mail post office 130. Post office client 214 also manages the delivery of messages prepared by mail user agent 212 that are stored in the secondary storage device 230. One skilled in the art will appreciate that if post office client 214 is based on the POP3 standard, then post office client 214 will assist in the transfer of mail messages retained at the electronic mail post office 130 to a local mail repository 232. Finally, archive reader 216 is a program, such as a modified version of Netscape Navigator from Netscape Communications, Inc., that is executed by CPU 240 and facilitates communication between the client and archive facility 140 over network 150.

Figure 3:
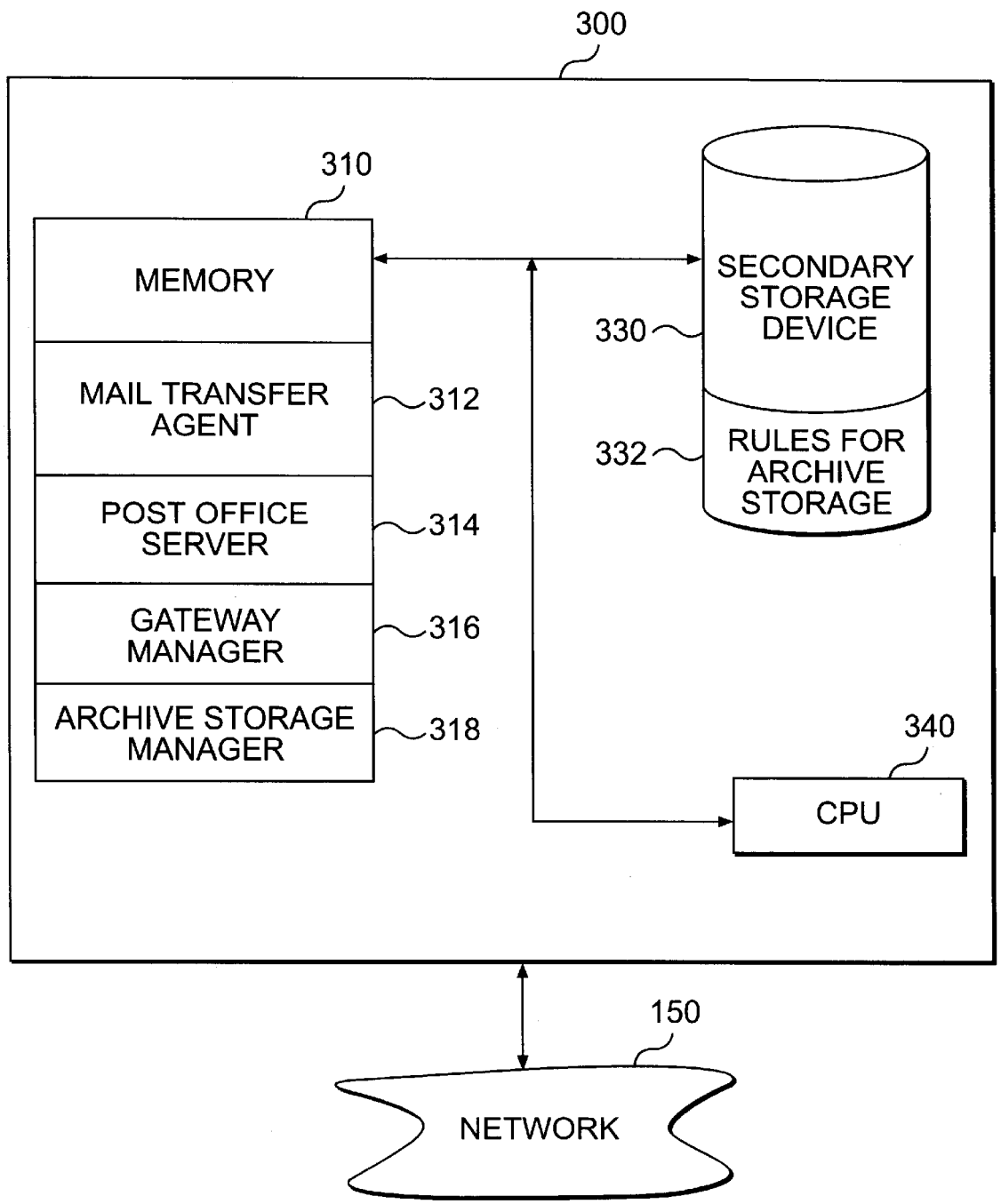
FIG. 3 is a block diagram of an exemplary system architecture for a post office facility with which the invention may be implemented.

FIG. 3 depicts a computer architecture 300 associated with post office facility 130 in greater detail. Computer architecture 300 includes a memory 310, a secondary storage device 330, and CPU 340. Memory 310 includes a mail transfer agent 312, a post office server 314, a gateway manager 316, and an archive storage manager 318. Secondary storage device 330 includes rules for archive storage 332.

As mentioned above, post office facility 300 communicates with mail clients 110 and 120, and archive facility 140 over network 150. Mail transfer agent 312, post office server 314, gateway manager 316, and archive storage manager 318 are all computer programs that are executed by CPU 340. Mail transfer agent 312 facilitates the transfer of messages between post offices, such as other post offices connected directly to network 150 or to post offices connected to external networks 160. There are instances where the electronic mail post office is a proprietary system and where the electronic mail messages manipulated by the post office do not conform precisely to the RFC 822 standard, such as Microsoft Mail. In this case, a gateway manager 316 will operate to translate incoming or outgoing messages to the appropriate form. One skilled in the art will appreciate that, even with such messages, reference can be made to the RFC 822 standard without loss of generality.

Post office server 314 is the program that communicates directly with post office client 214 located on the client computer over network 150. Post office server 314 notifies post office client 214 of new messages, and facilitates the transfer of message information to post office client 214. Mail that is retained within the electronic mail post office for a particular client is stored in secondary storage device 230.

Archive storage manager 318 is the program that communicates directly with an archive storage client located on archive facility 140 over network 150. The current information which allows the archive storage manager to determine whether an archive token should be generated for or removed from a given message is stored in the rules for archive storage 332. Archive storage manager 318 and the archive storage client operate together to transfer a copy of the message to be archived from the post office 130 to the archive facility 140. For example, the archive storage manager 318 may open an archive storage manager socket to write to the archive facility.

Figure 4:
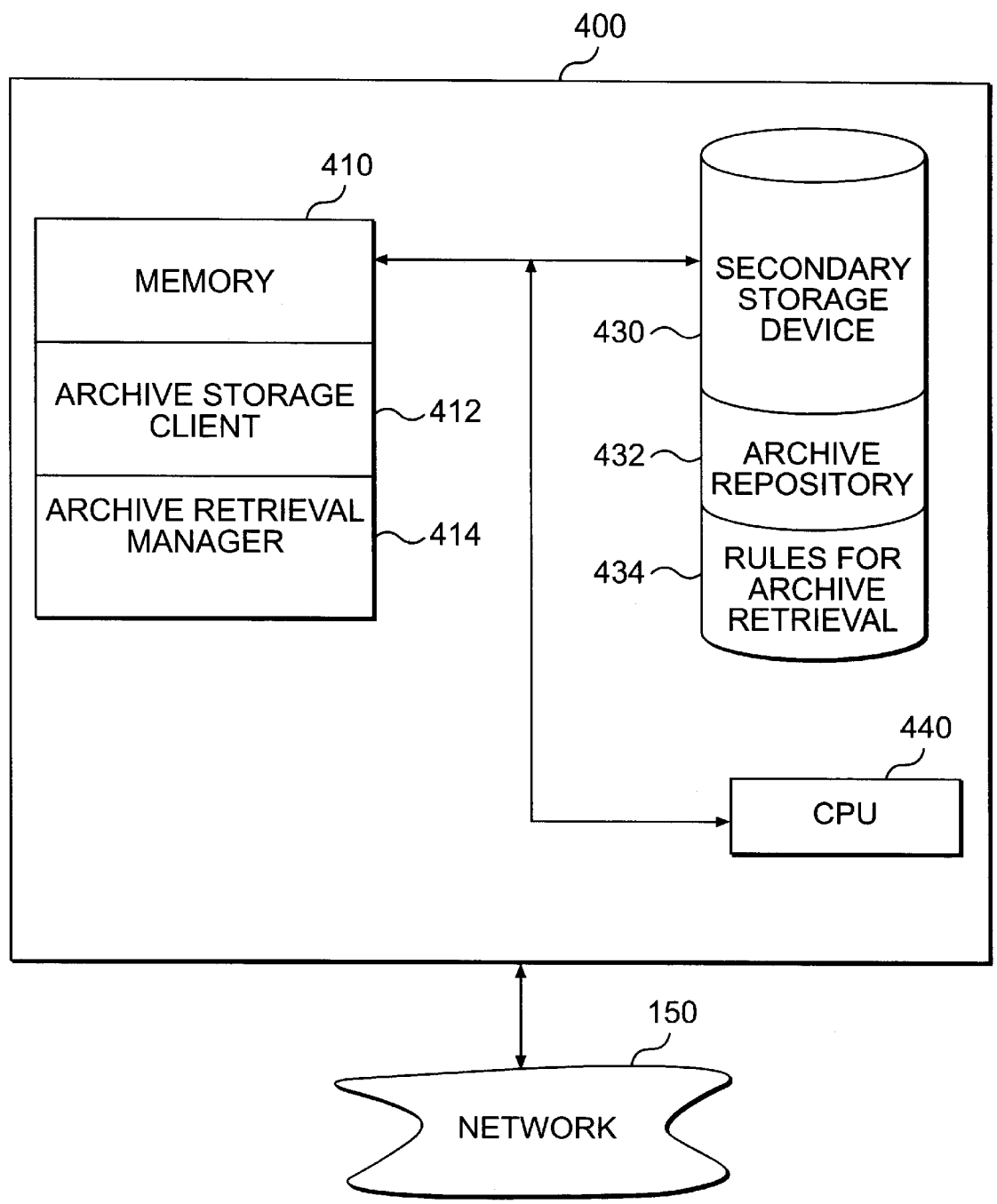
FIG. 4 is a block diagram of an exemplary system architecture for an archive facility with which the invention may be implemented.

FIG. 4 depicts a computer architecture 400 associated with an archive facility 140 in greater detail. Computer architecture 400 includes a memory 410, a secondary storage device 430, and CPU 440. Memory 410 includes archive storage client 412, and archive retrieval manager 414. Secondary storage device 430 includes an archive repository 432, and rules for archive retrieval 434.

As mentioned above, archive facility 400 communicates with electronic mail post office 130 and mail clients 110 and 120 over network 150. Archive storage client 412 and archive retrieval manager 414 are computer programs executed by CPU 440. Also, archive storage client 412 communicates with the archive storage manager 318 on electronic mail post office 130. Archive storage client 412 functions to transfer all messages determined by the archive storage manager 318 as intended for the archive facility to archive repository 432. Archive retrieval manager 414 facilitates communication between archive facility 140 and mail clients 110 or 120 over network 150. Archive retrieval manager 414 communicates directly with archive reader 216 and sorts messages stored in archive repository 432 and returns a results set to archive reader 216 based upon the rules for archive retrieval 434.

Figure 5:
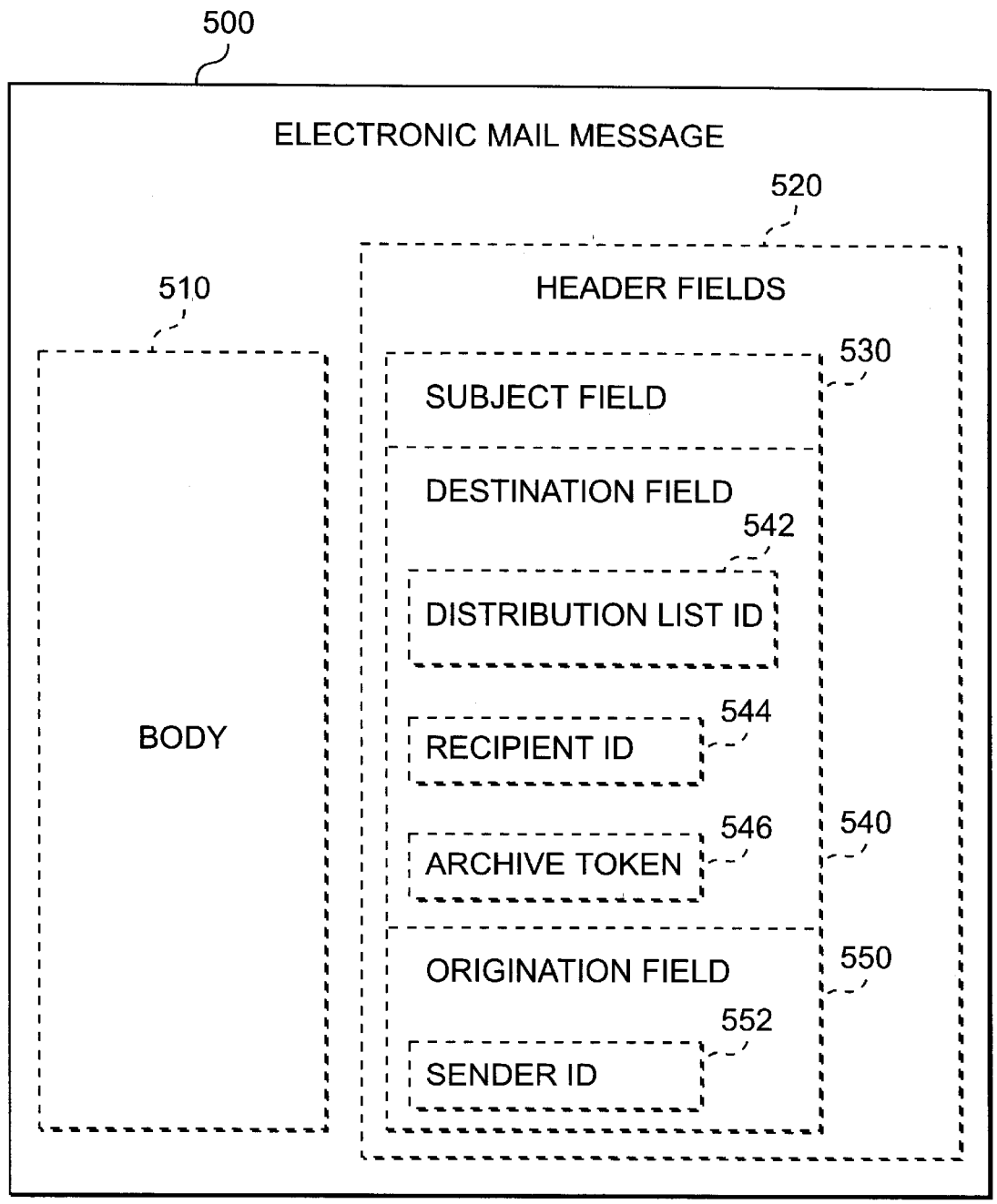
FIG. 5 is a block diagram of an exemplary electronic mail message in accordance with the principles of the invention.

As shown in FIG. 5, electronic mail message 500 has several fields that are structured according to RFC 822. Electronic mail message 500 has a body 510 and header fields 520, including a subject field 530, a destination field 540, and an origination field 550. Destination field 540 of the mail header 520 contains an identifier for a mail client recipient 544 and may also contain an archive token 546. The archive token 546 may be generated or validated by the archive storage manager 318. It does not necessarily have to be included by the sender of the message. Destination field 540 may also contain an identifier for a distribution list 542 that can be resolved by a post office facility into a plurality of identifiers for individual clients (i.e., members of the distribution list). Finally, message 500 identifies a sender 552.

The Process of Electronic Mail Delivery and Distribution Lists

Figure 6:
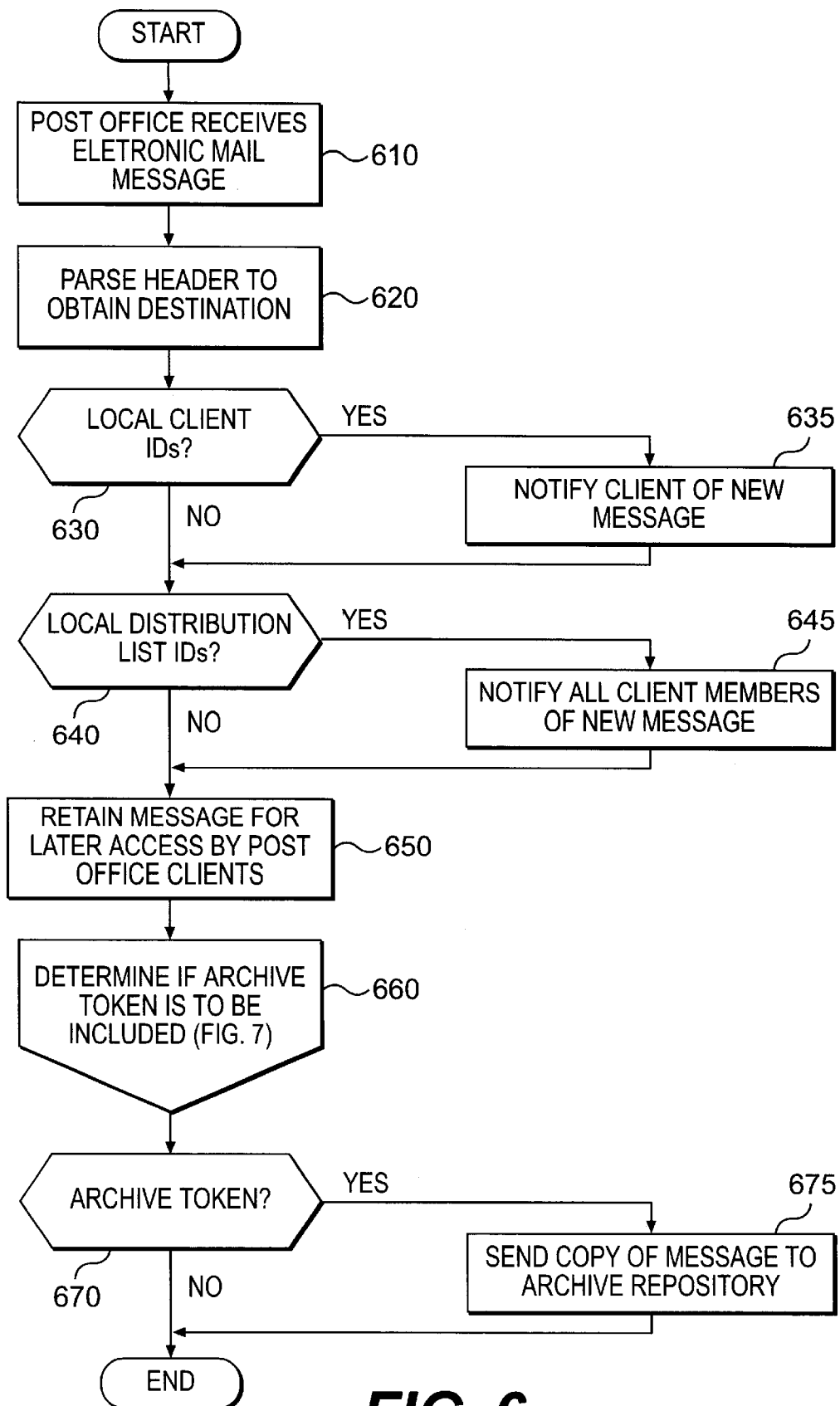
FIG. 6 is a flow chart of the steps a post office facility executes to sort incoming electronic mail messages and notify appropriate mail clients.

FIG. 6 is a flow chart of the operations that a local electronic post office uses to direct mail to a given local account as well as to an archive facility consistent with an implementation of the present invention. Initially, an electronic message, having been directed to the post office from a network through a mail transfer agent 312 is received (step 610) and examined for local address information (step 620). If the destination field of the electronic message contains an identifier corresponding to a local client, for example, recipient ID 544 in destination field 540 (step 630), then the local post office notifies the local client that a message has arrived (step 635).

The post office facility may also contain a database of distribution lists. Each distribution list matches a group alias to a list of single client identifiers. The post office facility examines the destination field to see if it contains an identifier for a local distribution list (step 640). If the destination field contains such a distribution list identifier (step 640), then the local post office notifies all clients associated with the distribution list that a message has arrived (step 645). The post office facility retains a copy of the message to be accessed by the designated recipient(s) (step 650). When the post office facility retains a message, the message is stored in space dedicated to a single client or in space dedicated to the distribution list. The dedicated space is known as the mailbox.

As explained in connection with FIG. 5, destination field 540 of an incoming message may include a field for an archive token 546, which is simply some type of indicator reflecting a determination that the message should be archived. Thus, step 660 in FIG. 6 determines whether an archive token is to be included or removed from the destination header field 540. This step is performed by the archive storage manager 318 in accordance with the process of FIG. 7 and the rules for archive storage 332. When the archive receives a message from the post office, it is stored in archive repository 432 depicted in FIG. 4. In one embodiment of the invention, the archive repository corresponds to the Local Mail Repository 232 of a mail client designated as an archive, where the archive token 546 may have the form archive@xyz.corp.com.

The Archive Storage Manager

Figure 7:
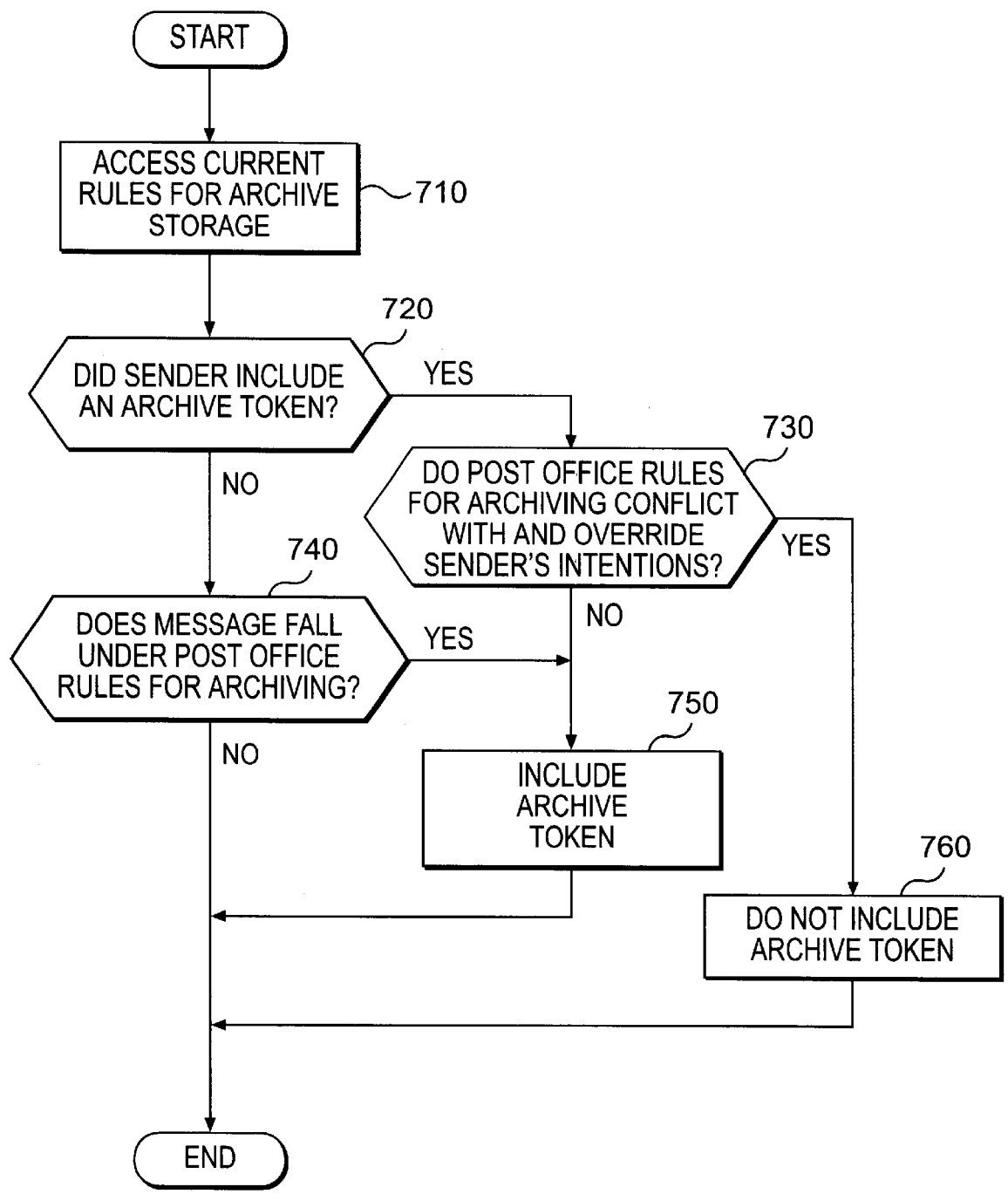
FIG. 7 is a flow chart of the steps performed by an archive facility to store electronic mail messages in a manner consistent with an implementation of the present invention.

FIG. 7 is a flow chart depicting the operating steps of archive storage manager 318 consistent with the present invention. Initially, archive storage manager 318 accesses the current rules for archive storage 332 (step 710). In general, the archive rules define conditions for archiving messages. The rules may instruct the system to archive all messages or only a selected group(s) of messages based on, for example, the identity of the sender, the identity of the recipient, the subject matter, the message contents, the message attachment (if any), or some combination of these items.

Next, the archive storage manager 318 checks the destination field 540 of the electronic mail message header 520 to determine whether the sender intended to archive the message by including an archive token in the field 540 (step 720). If the sender incorporated an archive token 546 in the message (step 720) and if the archive rules for storage 332 do not conflict with the sender's intention to archive the message (step 750), then the archive token 546 is retained (step 730). Likewise, if the sender did not incorporate an archive token 546 (step 720) but the message complies with the rules for archive storage 332 (step 740), then an archive token 546 is included in the message (step 750).

On the other hand, if the sender did not incorporate an archive token 546 (step 720) and the message does not comply with the rules for archive storage 332 (step 740), then no archive token 546 is included in the message. Also, if the sender incorporated an archive token 546 (step 720) but the rules for archive storage 332 conflict with and override the sender's intentions (step 730), then the archive token 546 is not included in the message (step 760). In this way, the archive storage manager 318 determines which messages passing through a post office facility are consistent with current rules for archive storage 332 and will be directed to the archive repository 432 for later retrieval.

The Archive Retrieval Manager

Figure 8:
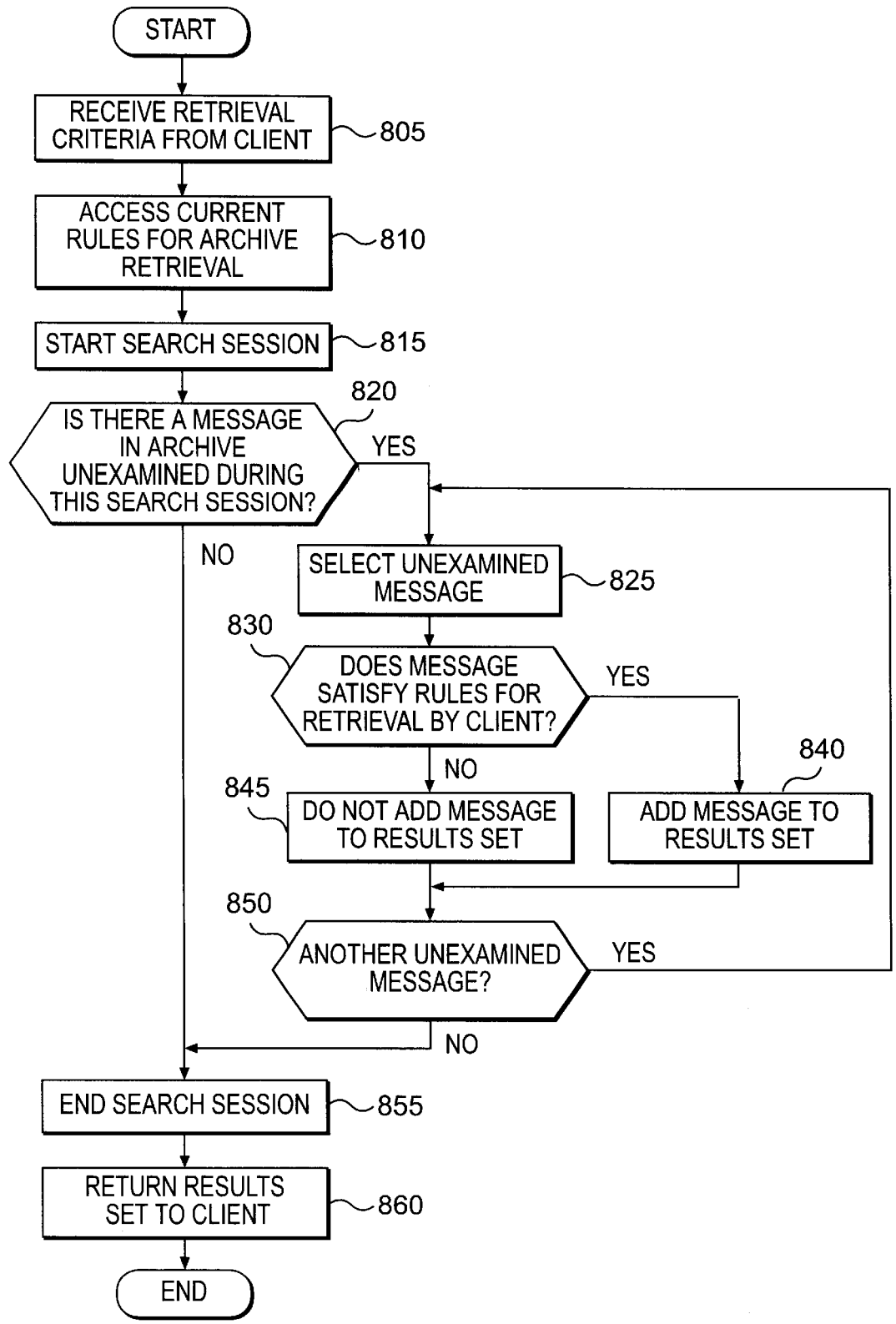
FIG. 8 is a flow chart of the steps performed by an archive facility to permit retrieval of stored electronic mail messages in a manner consistent with an implementation of the present invention.

FIG. 8 is a flow chart depicting the operation of archive retrieval manager 414 consistent with the present invention.

Initially, a client submits a request to the archive facility (step 805). Step 805 includes the delivery of a client identifier to the archive retrieval manager. For example, archive reader 216 may prompt the client to enter an identifier, or an identifier may be automatically routed to the archive retrieval manager by the network. Next, the archive retrieval manager 414 accesses the current rules for archive retrieval 434 (step 810). Next, archive retrieval manager 414 begins a search session (step 815). Upon the start of a search session, archive retrieval manager 414 checks to see if there are any unexamined messages in repository 432 for this search session (step 820). If there are none, then no further steps are taken and the session ends (step 855).

If there is an unexamined message (step 820), then archive retrieval manager 414 selects the unexamined message and applies the rules for archive retrieval (step 825). If the message satisfies the rules for retrieval (step 830), then the message is added to a results set (step 840). Otherwise, the message is not added to a results set for the search (step 845).

An example of a simple set of rules for archive retrieval might be that the recipient ID in the destination field of the message header matches the ID of the client requesting access. In such a case, the archive retrieval manager 414 parses the header field of a selected electronic mail message to determine the contents of the destination field. If the information contained in the destination field includes an identifier of the client requesting access, then archive manager 414 adds the message to a results set for that client. If, however, the destination field of a message does not contain an identifier for the client, then the archive retrieval manager 414 does not add that message to a results set.

Another rule for archive retrieval may be that the client requesting access is a member of a distribution list that is specified in the header field. Archive retrieval manager 414 then checks the destination field in order to see if it contains an identifier for a local distribution list. If there is an identifier for a local distribution list, then archive retrieval manager 414 checks to see if the client is a member of the distribution list. If the client is a member of the distribution list identified in the destination field, then the message is added to a results set for the client (step 840). Otherwise, archive retrieval manager 414 does not add the message to the results set (step 845) and checks to see if another unexamined message exists (step 850).

In this manner, the archive retrieval manager serially cycles through all of the unexamined messages that are present in the repository and makes available to the requesting archive reader 216 of the client all of those messages for which the client should be permitted access based on the rules for archive retrieval. Those skilled in the art will understand that other search processes may be used to locate electronic messages in the archive repository that satisfy a search criteria. Alternatively, the electronic messages in the archive repository may be indexed to permit application of another search algorithm.

Conclusion

Methods and apparatus consistent with the present invention store and manage access to electronic mail messages in an archive repository. The foregoing description of an implementation of the invention has been presented for purposes of illustration and description. It is not exhaustive and does not limit the invention to the precise form disclosed. Modifications and variations are possible in light of the above teachings or may be acquired from practicing the invention.

For example, instead of a linear search through the archive repository for a client's message, the archive manager may utilize a different, perhaps more efficient, search algorithm. In addition, messages may be archived based on archiving rules and without necessarily having to add an archive token to each archived message. Furthermore, although aspects of the present invention are described as being stored in memory and other storage mediums, one skilled in the art will appreciate that these aspects of the present invention can also be stored on or read from other types of computer-readable media, such as secondary storage devices, like hard disks, floppy disks, or CD-ROM; a carrier wave or other propagation medium from the Internet; or other forms of RAM or ROM. Accordingly, the invention is not limited to the above described embodiments, but instead is defined by the appended claims in light of their full scope of equivalents.

What is claimed is:

1. A method for accessing stored messages, comprising:
    providing a message archive containing a plurality of messages, each reflecting a determination that the message should be archived and having a recipient identifier;
    permitting a requester access to certain messages in the message archive based on an identifier for the requester;
    wherein providing a message archive includes receiving a message; and
    storing the received message in the message archive when the message contains an archive token; and
    wherein storing the message includes analyzing stored information corresponding to the message; and
    including an archive token in the message based on rules for archive storage.

2. The method of claim 1 wherein permitting a requester access to select messages in the message archive includes
    receiving a request including the requester's identifier;
    locating any messages in the message archive with a recipient identifier that corresponds to the requester's identifier; and
    providing a results set including the located messages.

3. The method of claim 2 wherein providing a results set including the located messages includes
    displaying a view of the results set.

4. A message management method, comprising:
    receiving a message;
    determining whether the message contains an archive token;
    storing the message in a message archive when the message contains an archive token; and
    permitting a requester access to select messages in the message archive based on an identifier for the requester;
    wherein storing the message in a message archive includes analyzing stored information corresponding to the message; and
    including an archive token in the message based on rules for archive storage.

5. The method of claim 4 wherein permitting a requester access to select messages in the message archive includes
    receiving a request including the requester's identifier;
    locating messages in the message archive corresponding to the requester's identifier; and
    including the located messages in a results set.

6. The method of claim 5 wherein including the located messages in a results set includes
displaying a view of the results set.

7. A method for managing client access to multiple messages in an electronic mail archive repository, the method comprising:
receiving a message;
analyzing stored information corresponding to a field of the message;
including an archive token in the message based on rules for archive storage;
storing the message in a message archive when the message contains an archive token; and
permitting access to the stored messages including the steps:
receiving a request including an identifier to access stored messages reflecting an archive selection,
locating any of the archive's selected messages in the electronic mail archive repository reflecting the identifier, and
providing the selected message in a results set to the requester.

8. The method of claim 7, wherein locating any of the archive's selected messages includes
comparing the identifier associated with the access request with an identifier contained within the destination field of electronic mail header.

9. The method of claim 8, wherein the comparison of the identifier associated with the access request with an identifier contained within the destination field of the electronic mail header includes:
determining whether the identifier associated with the access request is also associated with a distribution list; and
determining whether an identifier contained within the destination field of the electronic mail header refers to the distribution list.

10. A message archive system, comprising:
a memory with program instructions for accessing stored messages; and
a processor responsive to the program instructions and configured to provide a message archive containing a plurality of messages, each reflecting a determination that the message should be archived and having a recipient identifier, and permit a requester access to certain messages in the message archive based on an identifier for the requester;
wherein the processor is further configured to receive a message, and store the received message in the message archive when the message contains an archive token; and
wherein the processor is further configured to analyze stored information corresponding to the message, and include an archive token in the message based on rules for archive storage.

11. The system of claim 10 wherein the processor is further configured to receive a request including the requester's identifier, locate any messages in the message archive with a recipient identifier that corresponds to the requester's identifier, and provide a results set including the located messages.

12. The system of claim 11 wherein the processor is further configured to display a view of the results set.

13. A message management system, comprising:
a memory having program instructions; and
a processor responsive to the program instructions and configured to receive a message, determine whether the message contains an archive token, and store the message in a message archive when the message contains an archive token, and permit a requester access to select messages in the message archive based on an identifier for the requester;
wherein the processor is further configured to analyze stored information corresponding to the message, and include an archive token in the message based on rules for archive storage.

14. The system of claim 13 wherein the processor is further configured to receive a request including the requester's identifier, locate messages in the message archive corresponding to the requester's identifier, and include the located messages in a results set.

15. The system of claim 14 wherein the processor is further configured to display a view of the results set.

16. A system for managing client access to multiple messages in an electronic mail archive repository, comprising:
a memory having program instructions; and
a processor responsive to the program instructions and configured to receive a message, analyze stored information corresponding to a field of the message, include an archive token in the message based on rules for archive storage, store the message in a message archive when the message contains an archive token, and permit access to the stored messages by (i) receiving a request including an identifier to access stored messages reflecting an archive selection, (ii) locating any of the archive's selected messages in the electronic mail archive repository reflecting the identifier, and (iii) providing the selected message in a results set to the requester.

17. The system of claim 16, wherein the processor is further configured to compare the identifier associated with the access request with an identifier contained within the destination field of electronic mail header.

18. The system of claim 17, the processor is further configured to determine whether the identifier associated with the access request is also associated with a distribution list, and determine whether an identifier contained within the destination field of the electronic mail header refers to the distribution list.

19. A computer-readable medium containing instructions for accessing stored messages, by:
providing a message archive containing a plurality of messages, each reflecting a determination that the message should be archived and having a recipient identifier; and
permitting a requester access to certain messages in the message archive based on an identifier for the requester;
wherein providing a message archive includes
receiving a message; and
storing the received message in the message archive when the message contains an archive token; and
wherein storing the message includes
analyzing stored information corresponding to the message; and
including an archive token in the message based on rules for archive storage.

20. The computer-readable medium of claim 19 wherein permitting a requester access to select messages in the message archive includes receiving a request including the requester's identifier;

locating any messages in the message archive with a recipient identifier that corresponds to the requester's identifier; and providing a results set including the located messages.

21. The computer-readable medium of claim 20 wherein providing a results set including the located messages includes displaying a view of the results set.

22. A computer-readable medium containing instructions for managing stored messages, by:

receiving a message;

determining whether the message contains an archive token;

storing the message in a message archive when the message contains an archive token; and permitting a requester access to select messages in the message archive based on an identifier for the requester;

wherein storing the message in a message archive includes analyzing stored information corresponding to the message; and including an archive token in the message based on rules for archive storage.

23. The computer-readable medium of claim 22 wherein permitting a requester access to select messages in the message archive includes receiving a request including the requester's identifier;

locating messages in the message archive corresponding to the requester's identifier; and including the located messages in a results set.

24. The computer-readable medium of claim 23 wherein including the located messages in a results set includes displaying a view of the results set.

25. A computer-readable medium containing instructions for managing client access to multiple messages in an electronic mail archive repository, by:

receiving a message;

analyzing stored information corresponding to a field of the message;

including an archive token in the message based on rules for archive storage;

storing the message in a message archive when the message contains an archive token; and permitting access to the stored messages including the steps:

receiving a request including an identifier to access stored messages reflecting an archive selection, locating any of the archive's selected messages in the electronic mail archive repository reflecting the identifier, providing the selected message in a results set to the requester.

26. The computer-readable medium of claim 25, wherein locating any of the archive's selected messages includes comparing the identifier associated with the access request with an identifier contained within the destination field of electronic mail header.

27. The computer-readable medium of claim 26, wherein the comparison of the identifier associated with the access request with an identifier contained within the destination field of the electronic mail header includes:

determining whether the identifier associated with the access request is also associated with a distribution list; and determining whether an identifier contained within the destination field of the electronic mail header refers to the distribution list.

* * * * *

UNITED STATES PATENT AND TRADEMARK OFFICE
CERTIFICATE OF CORRECTION

PATENT NO.      : 6,609,138 B1
DATED           : August 19, 2003
INVENTOR(S)     : Charles Merriam It is certified that error appears in the above-identified patent and that said Letters Patent is hereby corrected as shown below:

Column 10,
Line 40, "claim 17, the" should read -- claim 17, wherein the --.

Signed and Sealed this

Second Day of December, 2003

JAMES E. ROGAN
*Director of the United States Patent and Trademark Office*